(12) United States Patent
Jowett et al.

(10) Patent No.: US 8,673,140 B2
(45) Date of Patent: Mar. 18, 2014

(54) BIOLOGICAL FILTRATION SYSTEM WITH SOCKS OF ABSORBENT MATERIAL

(75) Inventors: E. Craig Jowett, Rockwood (CA); Christopher Donald Jowett, Rockwood (CA)

(73) Assignee: Rowanwood IP Inc., Rockwood, Ontario (CA)

( * ) Notice: Subject to any disclaimer, the term of this patent is extended or adjusted under 35 U.S.C. 154(b) by 288 days.

(21) Appl. No.: 13/131,900

(22) PCT Filed: Nov. 30, 2009

(86) PCT No.: PCT/CA2009/001731
§ 371 (c)(1),
(2), (4) Date: Jun. 27, 2011

(87) PCT Pub. No.: WO2010/063102
PCT Pub. Date: Jun. 10, 2010

(65) Prior Publication Data
US 2011/0284438 A1   Nov. 24, 2011

(30) Foreign Application Priority Data
Dec. 1, 2008   (GB) .................................. 0821881.0

(51) Int. Cl.
*C02F 3/04* (2006.01)
*C02F 3/10* (2006.01)
*C02F 3/06* (2006.01)

(52) U.S. Cl.
CPC . *C02F 3/04* (2013.01); *C02F 3/101* (2013.01); *C02F 3/06* (2013.01); *C02F 2203/006* (2013.01)
USPC .......................................... 210/150; 210/615

(58) Field of Classification Search
USPC .................. 210/150, 151, 615, 617
See application file for complete search history.

(56) References Cited

U.S. PATENT DOCUMENTS

| | | | |
|---|---|---|---|
| 4,005,010 A * | 1/1977 | Lunt .............................. | 210/615 |
| 4,810,385 A * | 3/1989 | Hater et al. .................... | 210/150 |
| 5,762,784 A * | 6/1998 | Jowett ........................... | 210/150 |
| 5,997,747 A | 12/1999 | Jowett | |
| 6,036,851 A * | 3/2000 | Simmering et al. .......... | 210/150 |
| 6,153,094 A | 11/2000 | Jowett et al. | |
| 6,383,372 B1 * | 5/2002 | Houck et al. .................. | 210/150 |
| 6,440,304 B2 * | 8/2002 | Houck et al. .................. | 210/282 |
| 6,808,622 B2 * | 10/2004 | Okamoto et al. ............. | 210/151 |
| 2002/0134728 A1 * | 9/2002 | Festa et al. .................... | 210/617 |
| 2002/0158011 A1 * | 10/2002 | Yamada ........................ | 210/617 |

* cited by examiner

*Primary Examiner* — Christopher Upton
(74) *Attorney, Agent, or Firm* — Anthony Asquith Corp.

(57) ABSTRACT

In an apparatus for treating wastewater, e.g sewage water, the water passes through absorbent material. The material comprises e.g inexpensive scraps or off-cuts of plastic foam. The pieces of material are contained by being stuffed into lengths of plastic mesh tubing, which are then formed into closed-ended socks. The socks are stacked in layers, and the water to be treated is trickled down through the layers. The socks can also advantageously be used for anaerobic and submerged treatment of wastewater.

12 Claims, 4 Drawing Sheets

BIOLOGICAL FILTRATION SYSTEM WITH SOCKS OF ABSORBENT MATERIAL

This technology relates to the treatment of wastewater. It is a development of the technology disclosed in patent publication U.S. Pat. No. 6,153,094 (November 2000, Jowett+McMaster). There, a trickle filter is described, in which wastewater is aerated while percolating down through a treatment medium. Aeration promotes the conversion of ammonium dissolved in the wastewater to nitrate, and lowers the carbonaceous BOD content of the water.

BACKGROUND TO THE INVENTION

As described in U.S. Pat. No. 6,153,094, the filter medium, when arranged as a random heap of five-centimeter cubes of soft highly-absorbent foam, has the advantageous property of holding the wastewater physically "up in the air". That is to say: the wastewater, having being dosed onto the topmost portions of the filter medium, does not then drain straight down through the whole filter medium, but rather the wastewater is absorbed in, and retained in, the cubes of water-absorbing foam material when the dosing episode ends.

The water remains held up in, and by, the absorbent foam material of the cubes, during the period between dosings. The water proceeds gradually and progressively step-by-step down through the heap or stack, as subsequent dosings are administered to the stack, whereby large quantities of water are held up, in the air, within the cubes, between dosings. The fact that the water proceeds downwards by successive stages, moving only during (and a little after) the separate dosing episodes, characterizes this particular type of downward travel of the water as what may be termed champagne-fountain type, or bucket-brigade type, of downward movement.

When a dose of wastewater is applied to a cube of absorbent foam material, that cube becomes saturated, and overflows. When the dosing episode ceases, the excess water drains out of the cube, until only a remnant volume is retained in the cube. The magnitude of this remnant or retained volume depends on such characteristics of the material as its permeability, absorbency, capillarity, etc. It is desirable, for effective wastewater treatment, that this remnant volume be a substantial portion of the cube.

The magnitude of the volume retained in the particular cube depends also on the manner in which water drains out of that cube of absorbent material. Suppose the cube is so arranged in the heap of cubes that the underside of the cube is considerably squashed against the cube beneath: now, water can drain easily out of the upper cube into the lower cube, through what amounts to a hydraulically open connecting bridge or drain connection between the upper and lower cubes.

The more tightly the upper and lower cubes are squashed together, the larger the cross-sectional throat area of the drainage bridge between them, and the easier it is for water to drain out of the upper cube, into the lower cube. It follows that the magnitude of the remnant volume of water retained in the upper cube is inversely proportional to the throat area of the drainage-bridge between the upper and lower cubes—the larger the drainage-bridge throat area between the cubes, the smaller the volume of water retained in the upper cube, between dosings. Or, in other words: the narrower the throat of the drainage-bridge, the more it inhibits drainage.

Therefore, it may be regarded, as a first generality, that the throats of the drainage-bridges between the cubes should be small, in order that the volumes of retained water in the cubes, between dosings, may be large. The greater the remnant volumes of water that are retained in the (many) cubes, between dosings, the greater the aeration effect of the heap of cubes, as a whole, on the water being aerated, during the periods between dosings. Where the drainage-bridge throat between the cubes is very small, it can be expected that the magnitude of the remnant volume of water retained in the upper cube would then be maximised. (Theoretically, the maximum remnant volume of water retained in the upper cube would occur if the upper cube were not touching the lower cube, at all.)

However, there can be a disadvantage to providing too large a remnant or retained volume in the cubes. That is to say: it can be disadvantageous for the throat of the drainage bridge between adjacent cubes to be very small (or zero). The disadvantage, when the drainage bridge is very small, is that, when a new dose is applied to the upper cube, the excess water tends to drain down from the upper cube—not by draining through the (very small) drainage bridge throat between the cubes—but by flowing down the outside surfaces of the cubes.

What would happen, if this effect were to predominate, is that the remnant water inside the upper cube, though large in volume, would become largely isolated, and relatively unaffected by the dosing episode. That is to say: the water that drains down from the upper cube to the lower cube, during the dosing episode, would be the same water that has just been applied to the upper cube; the wastewater actually residing inside and within the upper cube would stay where it is, during the dosing episode, i.e would stay inside the upper cube. Thus, what can happen, if and when the drainage-bridge throat is too small, is that the volume of water retained inside the upper cube, though large, can become stagnant.

In short, the drainage-bridge throat areas between adjacent cubes of the filter medium should not be too large, but neither should they be too small. Where the drainage-bridge is too small (e.g if the cubes are barely touching), the volume of wastewater retained in the upper cube is large, but the remnant water might be stagnant. On the other hand, where the drainage-bridge throat area is too large and wide open (e.g if the cubes are squashed tightly together), then the volume of wastewater retained in the upper cube would be small, between dosings, and in that case, the dose of wastewater might then pass too quickly down through the whole heap of cubes, whereby the heap would be only marginally effective to aerate the wastewater. It follows that a key to effective and thorough treatment of the wastewater is to ensure that the drainage-bridge throat-areas are neither too large nor too small.

It has been recognised that, fortunately, the extremes at which the above-described disadvantageous effects occur do leave a considerable intermediate range. Thus, it is readily possible for the designer to engineer a heap of cubes of absorbent foam material such that, on the average, the throat-areas of the drainage-bridges between the cubes are neither too large nor too small. As disclosed in U.S. Pat. No. 6,153, 094, one way in which the designer can arrange for the drainage-bridge throat-areas to be, on the average, the right size was to provide the filter medium in the form of a randomly-arranged heap of five-centimeter cubes of soft plastic foam material. As shown in FIG. 10 of U.S. Pat. No. 6,153,094, the cubes can be contained (loosely) inside a mesh bag.

The technology as disclosed herein is aimed at providing the filter medium in a configuration that provides as effective a degree of treatment as the said random heap of five-cm cubes, but in a configuration in which the filter medium has been provided at a fraction of the cost of the five-cm cubes.

Designers have recognised that, in order to accomplish the best performance, when using the cubes, it is preferred to use a foam that is very permeable, and yet not as soft (i.e physically soft, or squashy) as might be expected in a traditional foam of such high permeability. That is to say: the foam of the cubes should be such that water soaks very easily into the foam, and yet the foam should be mechanically able to resist the weight of the absorbed water, which tends to compress the foam.

It is not difficult to manufacture foam that has these advantageous characteristics. However, the fact that such foam lies a little outside the commercial mainstream of foam manufacture, plus the fact that the foam has to be cut up into regular cubes, means that the five-cm cubes can be rather expensive. The technology as disclosed herein is aimed at providing the filter medium using fewer resources than has been the case in the prior art.

FEATURES OF THE INVENTION

In the new biological filtration system as described herein, the apparatus includes a sock, or preferably several socks, having respective casings. The casing is of net or mesh, having open spaces or apertures. The mesh casing may be rigid, but preferably the casing is flexible.

The socks are stuffed with respective quantities of pieces of water-absorbent filter material, such as plastic foam, which preferably is soft and pliable, and is elastically resilient. The apertures in the casing should be large enough that the pieces of filter material retained in the casing are well exposed to air and water.

Preferably, the apertures defined by the mesh are so large that, in respect of eighty percent or more of the apertures of the casing of the sock, a circle of at least five millimeters diameter can be inscribed within the open space—the pieces of water-absorbent material being large enough that they are retained by a mesh with such apertures.

The apertures in the casing are so small, in relation to the sizes of the pieces, that the casing physically retains the pieces within itself. Of course, if and when (some of) the pieces are small, then the apertures should be correspondingly small.

The filter material preferably should be stuffed so tightly into the casings of the socks that the filter material is compressed, and the material of the casing is stressed under tension. The casing, thus stressed, acquires a degree of mechanical rigidity—in the same manner that a balloon gains rigidity by being inflated. The degree of acquired rigidity depends on the elasticity of the material being stuffed into the foam: if the stuffing material were substantially not elastic (like e.g fabric), stuffing the sock would not have the same effect in making the sock rigid.

As described above, the five-cm foam cubes arranged in a random heap provide an excellent filter medium. However, of course, such cubes are procured by cutting newly-manufactured foam into the appropriately-shaped pieces. It would be very rare for used or waste foam to be available that could economically be processed into five-cm cubes. Waste or scrap foam often comes in wide, thin sheets, which cannot be made into cubes or other chunky shapes. Rather, wide thin sheets tend to lie down horizontally in overlapping sheets, a configuration that creates a barrier to the circulation of air between the pieces of foam.

The stuffed sock, as described herein, enables the use of many different shapes, and many different materials, that would otherwise be poorly suited for use in or as a filter medium.

The pieces of filter material preferably are packed into the casing of the sock with such a degree of tightness that the pieces are compressed, and the casing is stressed in tension. The pieces preferably are compressed so tightly that the material bulges out (slightly) through the apertures in the mesh. The pieces should lie squashed together and in contact with each other at many contact-patches between the pieces within the sock. Preferably, several socks are arranged in a stack of socks, in which one sock rests upon another. (It is noted that the material should bulge out when the sock is in operation and is wet; preferably, also, the material should bulge out through the apertures when the sock is dry, and when not in a stack with other socks.)

The stuffed socks, arranged as described herein, can be functionally equivalent to the five-cm cubes of foam, from the standpoint of excellence of water treatment, but the stuffed socks can be procured at a fraction of the cost of the five-cm cubes.

In a free-draining filtration apparatus, nozzles or the like deposit the water to be biologically treated on top of the stack of socks. The water trickles down through the stack of socks, though the contact areas between a sock above and a sock below, in much the same way as has been described in relation to the heap of foam cubes. The treated water drains out from the bottom of the stack of socks.

LIST OF DRAWINGS

The technology will now be further described with reference to the accompanying drawings, in which.

The scope of the patent protection sought herein is defined by the accompanying claims.

Figures 1, 2:
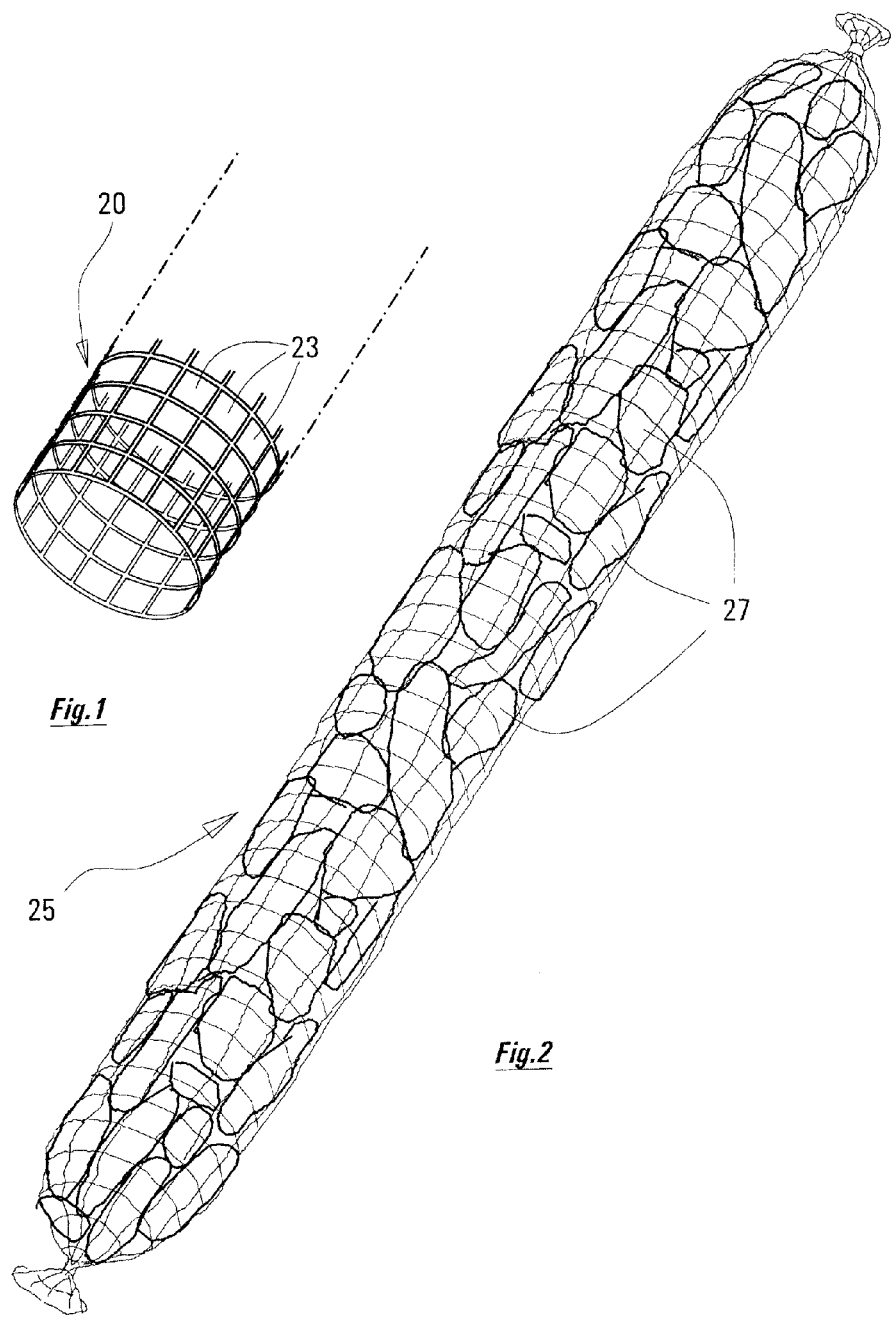
FIG. 1 is a pictorial view of a casing in the form of a tube of plastic mesh material, of the kind as used to establish a sock, for use as a component of a wastewater trickle-filter.
FIG. 2 shows the sock. The sock includes the mesh material, which houses several pieces of soft resilient plastic foam material.

The material of the tubular casing 20 shown in the example of FIG. 1 is polyethylene, being a plastic that is inert with respect to water, and to the substances likely to be contained in sewage or other kinds of wastewater.

The casing 20 is formed from mesh or netting. The casing serves as a container for a quantity of pieces of soft resilient foam, whereby the sizes of the apertures 23 in the mesh of the tube should be chosen in relation to the sizes of the pieces of foam, such that the pieces cannot escape from the sock by passing through the apertures. Apart from that, the apertures 23 in the mesh should be large enough to permit the free flow of air and water into, through, and out of, the socks.

The material of the casing should not interfere with through-flow of water. Preferably, the material of the casing should neither repel nor absorb water. Thus, a material such as sacking, though capable of passing air, might be absorbent enough to inhibit the free through-flow of water, and thus is less preferred.

The sock 25 shown in FIG. 2 is stuffed with pieces 27 of plastic foam. The foam material in the example is polyurethane, which is inert with respect to water, and to the substances likely to be contained in sewage or other kinds of wastewater.

Figure 3:
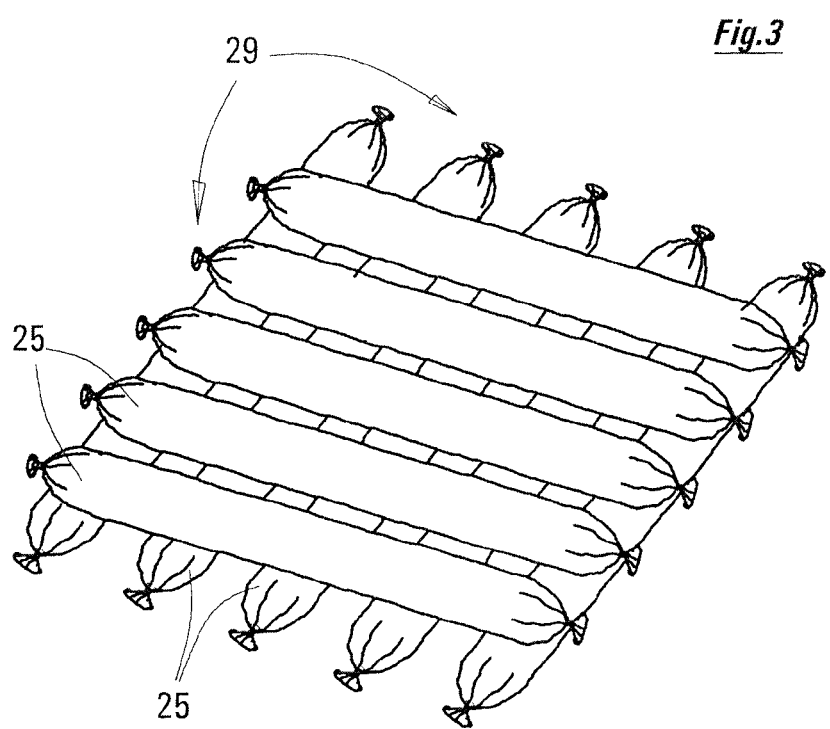
FIG. 3 is a pictorial view of a stack of several socks, arranged in layers.

FIG. 3 shows a number of the stuffed socks 25 arranged in layers 29. Within each layer, the respective socks preferably are oriented more or less parallel to each other. The socks in one layer are oriented preferably at an angle (e.g a right angle) with respect to the socks in the layers above and below.

Figure 4:
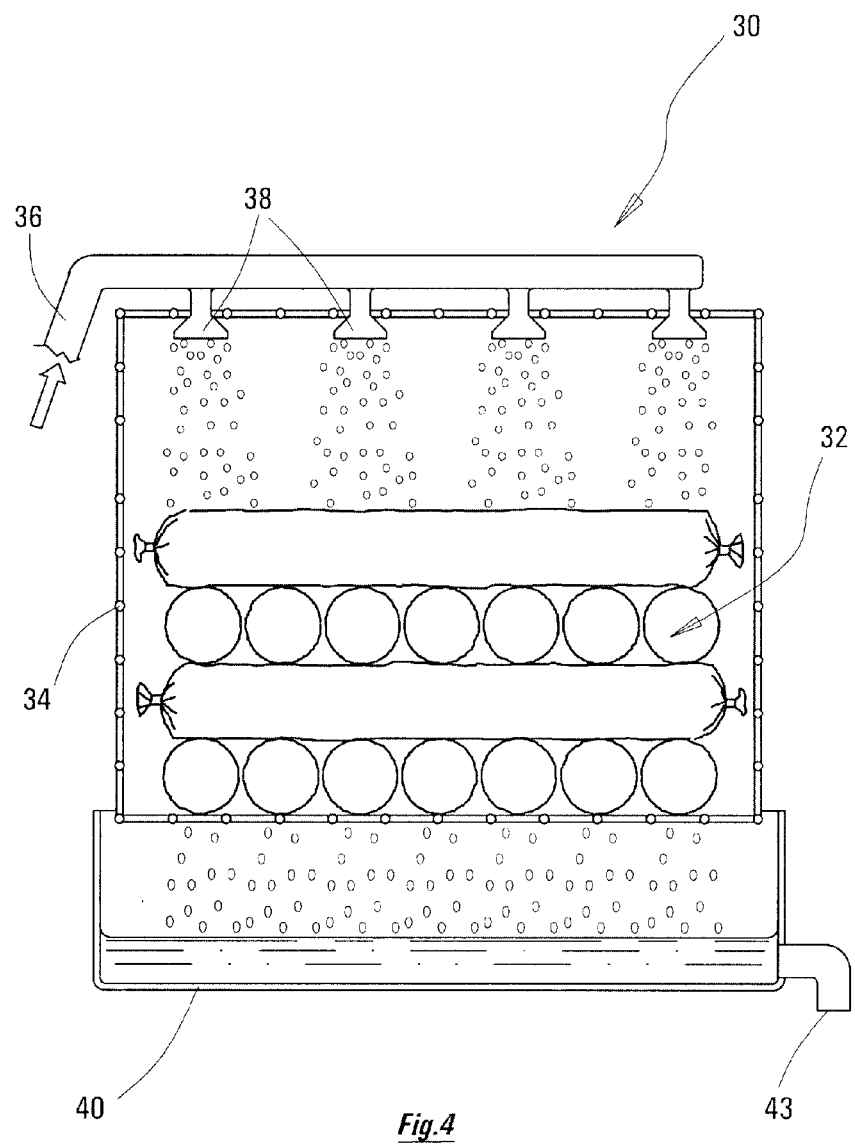
FIG. 4 is a side elevation of the stack, shown with some other components of the trickle-filter, in use to treat wastewater.

FIG. 4 shows a biological filtration apparatus 30, which includes a stack 32 of layers 29 of socks 25. It includes also a retaining cage 34 made of rigid plastic having an open grid form, in which the stack of layers of socks is housed. The cage 34 is such that (atmospheric) air can enter and leave the cage 34 without restriction. A fan (not shown) can be added, to improve air circulation, if required.

The apparatus 30 includes also an inlet port 36, and a set of nozzles 38 or sprinklers through which incoming wastewater to be aerated can be distributed evenly over the stack 32 of layers of socks. It includes also a collector 40, for collecting the now-aerated water that drips down from the stack of layers of socks. The collector 40 has a drain port 43, through which the treated (aerated) water is conveyed away from the apparatus, for disposal or further treatment as required.

In an alternative, the collector is omitted. This is appropriate in cases where the aerated treated water can be allowed to drain straight into a soakaway, tile-bed, or other mechanism for infiltrating water into the ground.

Prior to a dosing episode, water from previous dosings has partially drained out of the socks, leaving respective remnant volumes of water retained in the socks—or rather, within the pieces of foam within the socks. Just before the dosing episode, all the water in the apparatus is still. There is no water emerging from the nozzles 38. Also prior to the dosing episode, although there is a good deal of water trapped in the remnant volumes of the pieces 27 of foam, i.e suspended "up in the air", there is no water dripping down from the stack 32 into the collector 40.

During a dosing episode, wastewater emerges from the nozzles 38, as shown in FIG. 4, and this incoming water replaces the water in the pieces 27 of foam in the uppermost sock or socks. The same thing happens in the layer below—that is to say: during the dosing episode, the water that was in each sock prior to the dosing episode is displaced by water descending from the sock above. During the dosing episode, the water that (prior to the dosing episode) was in the bottommost sock trickles out into the collector 40, as shown in FIG. 4.

In a typical commercial filtration apparatus, as used for treating sewage from a septic tank system catering for e.g six houses, the apparatus would include a stack of e.g eight to twelve layers of socks, each layer laid horizontally upon the layer below. The socks in the layers preferably are oriented at right angles to the adjacent layers above and below, but other angles may be used. Preferably, if not a right angle, the socks in one layer should be aligned at about thirty degrees or more to the socks in the adjacent layers. (The considerations regarding the angles between adjacent layers can vary according to whether the socks are soft or hard, as will be explained later.)

Although some products that are made of plastic foam are specially moulded, plastic foam generally is manufactured in very large slabs and the various products that are made of foam are cut, with machine-cutters, from the large slabs. Thus, there can be a good deal of wastage in the form of scrap pieces, ends, offcuts, etc. Generally, such scrap pieces can be procured at a considerable cost saving, when compared with the cost of the same volume of foam in the form of specially-cut-to-size pieces.

The functional properties of the scrap pieces of foam (e.g their capillarity, porosity, etc) may be regarded as being the equal of the cut pieces. The scrap pieces are different only as to their shapes and sizes—which, the pieces being scrap, are usually irregular and unpredictable. Scrap might come in the form of e.g small rolls of two-cm-thick sheet foam, or in the form of e.g eight-cm square prisms, thirty cm long. One thing, however, that the great majority of the available scrap pieces of foam have in common, is that the pieces are small enough that it is a simple matter to stuff the pieces into plastic mesh tubing, especially if the tubing has a diameter of ten or fifteen cm. Thus, small rectangles, rolled-up sheets, in fact almost any form in which foam can be obtained, are all suitable to be stuffed into such tubing.

If suitable pieces of scrap foam are available, except that the pieces are too large to be stuffed easily into the casing, the pieces should be formed (e.g cut, shredded, etc) into convenient suitably-sized pieces, i.e into pieces so sized that the pieces, or a bundle of the pieces, can readily be stuffed into the casing.

When the filtration system made use of five-cm foam cubes (U.S. Pat. No. 6,153,094), the sizes of all the drainage-bridge throats were easily engineered to lie within the optimum range for good aeration, being neither too large nor too small, as described above. However, when the pieces of foam are in the form of foam scrap, the designer cannot predict and engineer the sizes of the drainage-bridge throats to anything like the same level of accurate predictability.

Also, when the socks themselves are being manufactured, and operators are stuffing scrap pieces of foam into the socks, the designer will have little control over the tightness of the stuffing, and also will have little control over the mix of sizes and shapes of the pieces that go into a particular sock. Furthermore, the designers know that, when foam cubes were used (U.S. Pat. No. 6,153,094) in the filtration system, in some cases it could be rather critical as to the manner in which the cubes were disposed; if the cubes were arranged in regular rows, for example, rather than in a random heap, the rate of aeration of water might be significantly reduced.

For these reasons, it might be expected that the designer would have considerable difficulty in designing a system to work properly when using unpredictably-irregular scrap pieces of foam. However, it is recognised that such is not the case, for the reasons as will now be explained.

It is recognised that it might not be satisfactory for the scrap pieces of foam to be placed all in a large mesh bag, and for that bag to be used as the filter medium. In that case, the water would not flow down evenly through the pieces, and it would be very unlikely that proper aeration would be procured. If the pieces were to be put into a large mesh bag, the sizes of the drainage-bridge throats, and consequently the extent to which the water was held up in the air, between dosings, would hardly be even slightly predictable.

However, as pointed out, in the present technology the water-conducting and water-retaining structure provided by the many stuffed socks themselves can be regarded as being functionally equivalent to the water-conducting and water-retaining structure provided by the above-mentioned foam cubes. It is recognised that the manner in which the socks touch each other is indeed quite predictable, especially if the socks are laid out in regular rows. (Attention is drawn to a contrast, here, with the cubes, where best aeration came from arranging the cubes, not in regular rows, but in a random heap.) Thus, the variations and unpredictabilities imposed by the fact of the variations in the sizes and shapes and characteristics of the scrap foam pieces, are rendered largely inconsequential, in that the physical structure that comprises the actual stack of socks provides an acceptable degree of consistency and predictability. That is to say, it is the stuffed sock itself, rather than the pieces of foam stuffed into the sock, that may be regarded as the functional equivalent of the five-cm cube.

Even though the flow of water down through and between the several pieces stuffed together into one sock might be erratic, nevertheless the water will pass down from sock to sock in a more predictable manner—and, it is recognised, in a manner that enables the designer to engineer biological filter systems with hardly less design accuracy than when using the cubes. When one sock rests on another, the drainage-bridge throats at the points of contact, sock to sock, can be expected to be as predictable as the drainage-bridge throats are when using the cubes.

Of course, it might theoretically be possible for the stuffing of the socks to be done improperly. For example, the pieces might be stuffed so tightly into the sock that water simply passes around the outside of the socks, without being absorbed in, and retained in, the pieces inside the sock. It is recognised, however, that the range of acceptability of the reasonably-to-be-expected variations in the type and degree of stuffing is adequately high.

It should also be noted that, because the scrap material is so much less costly than the specially-manufactured cubes, the designer can provide a reasonable margin of extra material.

As mentioned, sometimes waste or scrap plastic foam material is available in the form of wide thin sheets. These can be cut up into smaller pieces, prior to being stuffed into the socks, but an alternative is to roll the sheet up into a cylinder, and to stuff the cylinder into the sock, whereby the sock contains only one single piece of foam. In that case, the roll of sheet foam and the casing of the sock preferably should be so arranged that no portion of the interior of the foam material is more than e.g five cm away from an open surface that is freely accessible to the air outside the sock. In fact, that preference exists, whatever the shape of the foam pieces.

The technology has been described, thus far, using the example of waste, offcuts, and other forms of scrap polyurethane foam as the material of the filter medium. However, other materials can be used, as will now be described.

One criterion of acceptability of the material to be stuffed into the socks is that the material should be water-absorbent. That is to say: the material should be capable, to a substantial extent, of water-retaining capillary action, i.e capillarity. Also, the material should be capable of being stuffed into a sock, which means that the material preferably should be soft and flexible, or pliable. Preferably, the material should be capable, when squeezed, e.g when squeezed by hand, of substantial deformation; and the material should be capable also, when released, of returning resiliently to (almost) its unsqueezed dimensions.

Preferably, the pieces of material stuffed into the socks should be of a very-absorbent nature, such as cotton towelling. It is possible to use pieces of material that are of the ordinarily-absorbent nature of textile fabric materials, such as e.g denim. However, the material must still have at least a non-negligible capability to absorb water, either within the fabric itself or, possibly, within small narrow voids between the pieces when the pieces are stuffed into the socks. The material would be unsuitable for use in the present technology if the material were not able, substantially at all, to absorb water by capillary action.

When the material is inherently of only a low absorbency, the pieces into which the material is cut or formed, prior to being stuffed into the socks, should be done in such manner as to promote the absorption performance of the sock as a whole, i.e to promote the ability of the small and narrow voids between the tightly stuffed pieces to retain water by capillarity. Thus, the pieces should preferably be in the form of many thin strips or ribbons, to maximise the resiliency and absorbency of the stuffed sock. A piece of textile fabric material would be classed as a thin strip, from this standpoint, if it were no more than e.g four cm wide. There is really no need for the material to be new, and post-consumer recycled materials can be used.

When the filter material is very absorbent, e.g is open-cell foam, the pieces do not have to be squashed in together so tightly as when the filter material is e.g towelling or denim. The random squashing together of pieces of less-absorbent material produces an overall more absorbent sock, where capillary forces in the small voids between the fabric pieces, as well as within the fabric pieces, holds and retains the water between dosing episodes.

Other materials that have a degree of absorbency can also be used. For example, the socks can be filled with peat (provided the fibrous strands of the peat are long enough that the material does not spill out of the casing of the sock). Similarly, long coir fibres can be used. It may be noted that hay or straw can have a substantial degree of absorbency, when many fibrous strands thereof are stuffed into a sock.

However, sand, though notionally absorbent in some circumstances, is not inherently capable of retaining water between dosings, i.e it dries out between dosings, and thus sand would not be suitable. Also, it is difficult to contain sand in such manner as to enable air to circulate freely therethrough and its great weight will deform the socks in the treatment unit.

Another major function of the filter material is to provide a habitat for the kinds of microbes that can break down the contaminants in the water. Any material that cannot provide such an adequate habitat, or that would itself be consumed or affected by the microbes, should be regarded as unsuitable for use in the technology described herein.

Pieces of absorbent plastic foam are, of course, inherently resilient in themselves. However, it is not essential that the individual pieces of filter material must have substantial physical resilience, in themselves; rather, the bundle of filter material that is stuffed into the sock should, as a bundle, have a substantial degree of resilience, such that the bundle of filter material, having been stuffed into the sock, is pressed together and is pressed against the casing of the sock.

The elasticity or "squeezability" of the material should be such that, after the material has been stuffed into the mesh casing, the material should resiliently expand, such that the pieces of material press against the mesh of the casing, and press against each other—at least at a sufficient number of contact points that the collection of pieces in the casing basically is held in a stationary location and position within the mesh casing, and by being pressed against the mesh casing.

Preferably, the pieces of material should not be so loosely stuffed, in the socks, that the pieces of material are free to float or move about within the casing. However, it might, in some cases, be acceptable if the pieces of material were so loosely stuffed as to be able to move freely in the socks when dry, provided the pieces were capable of expanding, when dosed with water, sufficiently for the pieces then to be held within, and by, the casing. However, preferably, the pieces should be stuffed into the sock such that, even when dry, the pieces are stuffed tightly enough that they are constrained, by their tightness, against movement within the casing.

On the other hand, the pieces of material should not be stuffed so tightly into the socks that the porosity of the material, and the capillarity performance of the material, would be adversely affected. If this were to happen, water dosed onto the sock would tend to flow around the outside of the sock, rather than into and through the material inside the sock, and thus tend to pass down through the stack too quickly. If this were to happen, the aeration treatment of the water might be incomplete, and the water that had been absorbed into the material might possibly become stagnant.

Preferably, the sock should be stuffed loosely enough that the sock, when stuffed, remains manually squeezable. (It is assumed, here, that the mesh of the casing of the sock is not so rigid as to prevent squeezing; however, it is not essential to the broad scope of the patent protection sought herein that the mesh be non-rigid.)

The designer should aim to procure such conditions in the stuffed sock, that the water applied on top of the sock passes slowly through the sock. If the water were simply to flow quickly around the outside of the sock, without being absorbed, that would not be preferred.

Again, the task of the designer is to see to it that the dosed water does not simply pass down the outside surfaces of the socks. If that were to happen, the passing water would not be properly aerated, and the water retained inside the socks might become stagnant. The water should be absorbed into the socks, and should remain in the socks between dosings, and then only drain out from underneath the sock when more water is dosed on top of the sock.

As mentioned, it may be regarded that the stuffed sock, as a physical structure, serves an equivalent function to that served by the five-cm cube of foam, as a physical structure, in the patent publication U.S. Pat. No. 6,153,094. That is to say: the functional role of the stuffed sock is, upon receiving a dose of water from above, to absorb that water into itself, simultaneously releasing the water that was already present within itself, prior to the dose. Thus, the stack of socks functions to pass the water gradually and progressively step-by-step down through the stack of socks, whereby large quantities of water are held up, i.e held up in the air, within the socks, between dosings.

The following test can be performed on a particular stuffed sock, to determine whether that sock is acceptable for use in the as-described technology, i.e:

provide a sock stuffed with pieces of absorbent material; the sock is dry;
the volume of the sock is Vsock liters (being the volume measured by encasing the sock in a bag of impermeable material and measuring the displacement of the bag);
support the stuffed sock with its cylindrical axis horizontal;
provide the support in such manner that the support neither inhibits nor promotes drainage of water from underneath the sock;
provide a volume of water equal to Vsock liters;
trickle that volume of water on top of the sock, evenly over the length of the sock;
collect and measure the volume Vdrain that drains out from underneath the sock.

If Vdrain is no more than half of Vsock, the sock is acceptable. That is to say: the pieces of material in the sock would in that case be of an acceptable degree of absorbency, and the pieces of material would not be stuffed too tightly into the sock.

The test should be done with the material fully wetted. Some plastic foam materials, for example, as manufactured, tend not to be readily wettable, or at least not at the first instance. Before the test, such materials should be pre-wetted; that is to say, the material should be pre-conditioned by being immersed in water and all the air squeezed out, then taken out of the water and all the water squeezed out. After this procedure has been repeated a few times, the foam material has become thoroughly wetted. Any material that lacks the ability to become wetted, upon being subjected to this procedure, should preferably be regarded as unsuitable for use in the present system. Thus, the above expression "dry" should be understood as "dry, but not hydrophobic". Of course, many materials, e.g most textile fabric materials, exhibit no difference in the degree and manner in which they absorb water whether pre-wetted or not.

Preferably, all the socks that make up the stack of socks should be capable of passing the above test.

It will be understood that, the more socks there are in the stack of socks, the more socks the water will encounter on its passage down though the stack. In turn, the more socks encountered, the more times the water remains held up in the air, and the more efficacious the aeration of the water.

The stack of stuffed socks preferably should be arranged in such manner that each drop of water, after being dosed on top of the stack of socks, encounters at least four socks as it trickles down through the stack. That is to say: there should be no path that a drop of water could take, down through the stack of socks, whereby the drop encountered fewer than four socks. Thus, at least in theory, the drop of water would be held stationary, up in the air, between dosings, a minimum of four times during the course of its journey down through the stack of socks.

The required size of the stack of socks might alternatively be stated as follows. Consider a drop of water travelling downwards through the stack, and contacting only the outer-surface or casings of the socks it encounters (i.e hypothetically not being absorbed into the absorbent material within the sock). The said drop preferably should encounter not less than fifty cm, in total, of sock surface on its downward journey.

It has been recognised that water contained within the interior of the five-cm cubes of plastic foam, as mentioned, can become anoxic, to the extent that it can support facultative or anaerobic bacteria. As much as fifty percent of the remnant water remaining in the cubes between doses, can be anoxic to this extent. The water inside the interiors of the cubes is not so static, however, as to become stagnant. (Of course, the water in the outer pores of the medium, i.e the pores that are closest to the surfaces that are exposed to the air, cannot become anoxic.)

Thus, the water, as it passes through the stack of cubes, is treated by both aerobic and anaerobic microbial action. This can be highly beneficial, in that aerobic treatment oxidises the ammonium content of the water e.g to nitrate, and anaerobic treatment then reduces the nitrate e.g to nitrogen gas. Thus, providing the filter medium in such a configuration as to provide a substantial anaerobic portion of the filter medium (in the centres of the cubes is advantageous because the resulting treated water can be substantially nitrate-free. BOD, ammonium, and some other contaminants and toxins can also be treated more effectively by a combination of both aerobic and anaerobic microbe colonies. The volume of sludge residue from the reactions can be expected to be less if the reactions are (partly) anaerobic.

It is recognised that the same effect can occur in the stuffed socks. That is to say, anaerobic colonies of microbes can be viable inside the interiors of the socks—or rather, inside the interiors of the pieces of absorbent filter material contained within the socks.

As described above, the flow direction of the water being treated has been vertically downwards through the filter medium, and this direction of flow is common in unsaturated trickle filters. As shown in e.g patent publication CA-2,372, 337 (In-Pipe Wastewater Treatment System, Jowett), an aerobic trickle filter can be so arranged that the water travels predominantly horizontally through the filter medium (though having a vertical travel component, especially during dosing). The filter medium disposed in stuffed socks, as described herein, also lends itself to this horizontal configuration. In that case, the stuffed socks are laid out in horizontal layers, the axes of the socks preferably being aligned perpendicular to the direction of flow.

In a related version of the present technology, the socks are kept submerged underwater. That is to say: the water that is being treated is contained in a suitable tank, and the level of water in the tank is substantially above the level of the socks.

Figure 5:
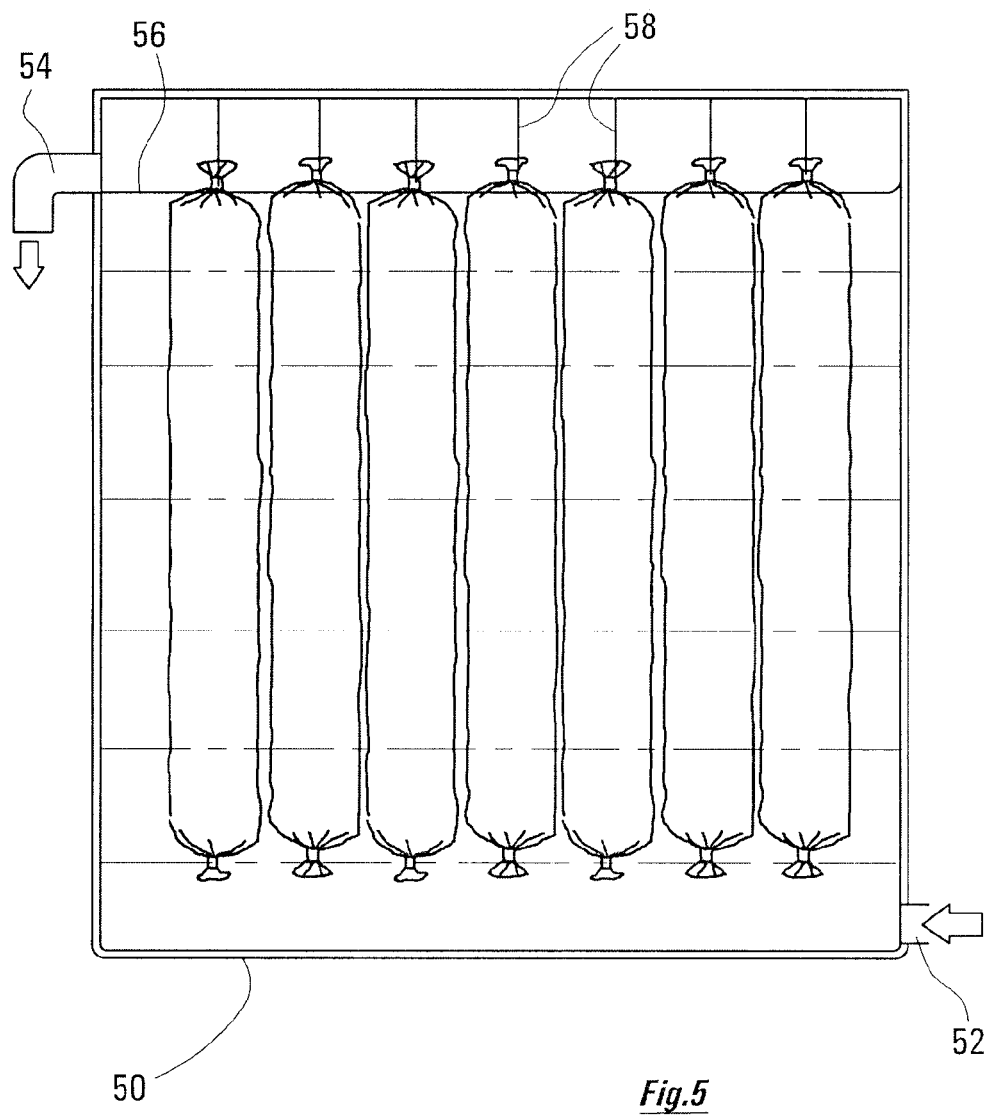
FIG. 5 is a side elevation of an alternative manner of arranging the socks, for treatment of wastewater.

FIG. 5 shows this version. For aeration treatment of the water, air is bubbled through the water in the tank 50. The contaminated water is fed into the tank, either continuously or by being dosed into the tank from time to time. The water to be treated is injected into the tank from underneath, through inlet port 52, and flows upwards through the tank. The treated water leaves from outlet port 54, the level of which determines the level 56 of water in the tank. The tank should have a capacity to contain a large enough volume of water, given the dosing rate (measured in liters per day), that the water preferably spends a residence time of e.g half a day in the tank.

In the submerged version, as described, the socks can be arrayed in a stack of horizontal layers, as previously described. But in the submerged version, the socks can also be suspended vertically (as shown in FIG. 5). That is to say, the several socks hang vertically from respective suspension points 58, e.g in bunches, down into the water contained in the tank.

The hanging configuration is advantageous in that individually suspended socks (or small groups of socks) can readily be lifted out of the tank, e.g for through-flushing or other servicing, replacement, etc.

Given that the water undergoing treatment is passing upwards through the bunches of hanging socks, the socks should be pressed together in the lateral sense, and in an encirclement sense or hoop sense, at least lightly, to the extent that the socks remain in mutual touching contact during treatment. The required degree of pressing together of the socks can be achieved by providing enough socks that the assembly of socks presses lightly against the sides of the tank 52.

Of course, if substantial open passageways were to be left between the socks, the water would tend to pass upwards through the open passageways between the socks, and thereby not be treated. However, it is not necessary to completely eliminate all open passageways between the socks. If the cross-section of an open passageway between the socks was small, the openness would not matter, because the up-flowing water (and the contaminants therein) would be drawn into the sock by the capillarity of the filter medium material within the socks. But if a point within an open space between the socks were to be more than about one centimeter away from the nearest surface of one of the socks, the danger might arise that water to be treated would simply flow up between the socks, through that space, without being affected thereby.

Vertical-axis socks might tend to sag sometimes, becoming e.g pear-shaped. If this is a problem, the vertical socks can be pinched at suitable height intervals, e.g every 30 cm, like a string of sausages.

It will be understood that the above-mentioned advantageous anaerobic portions of the filtration system can be procured all the more easily when the filter medium, in the socks, is submerged. Indeed, in the submerged case, the difficulty might lie rather in ensuring that the water is properly aerated.

On the other hand, in an alternative sub-version of the submerged suspended-socks version, the designers deliberately engineer the filtration system without aeration. The socks being submerged, typically all they need do to create anaerobic conditions is to refrain from bubbling air through the water. This can be useful where the system is used solely or mainly for anaerobic treatment—which might be done, for example, in a case where the effluent water is collected and conveyed to a separate aerobic station.

Some of the dimensions of the sock, as required for the purposes of this specification, will now be defined in more detail.

A "diameter" of the sock is a dimension of a cross-section of the sock. When the shape of the cross-section is a perfect circle, all diameters are the same; when the cross-sectional shape is not a circle, some of the diameters will be larger than others. The use herein of the term "diameter" should not be construed as a limitation that the cross-sectional shape must be a circle. Nor should the term "diameter" be construed as a limitation that a diameter is necessarily a line that passes through a particular point that has been designated as the centre of the cross-sectional shape.

Rather, a "diameter" of the sock is a dimension that is measured between two points, both of which are located on the inside surface of the casing of the sock. In order to define a diameter of the sock, the two points must face each other, on opposite sides of, and across, the cross-sectional shape. In respect of the two points on the inside wall of the casing, respective tangents drawn at those points, relative to the curvature of the inside wall of the casing, must be parallel to each other.

When the casing of the sock is flexible, or soft, (as preferred), usually the cross-sectional shape will contain no re-entrant elements. However, it is not ruled out that re-entrant elements of the shape might be present. Also, if the casing of the sock is rigid, or hard (which, though not preferred, is not prohibited herein), a re-entrant element to the cross-sectional shape is simply a matter of arranging the rigid shape to provide such an element. When the cross-sectional shape does include one or more re-entrant elements, one or both of the points that define the diameter of the sock may lie on such element.

It is noted that the said points are physically located on the actual inside wall of the casing of the sock. From the standpoint of defining a "diameter" of the sock, neither of the two points can lie in the open spaces arising from the mesh or net nature of the casing of the sock.

The plane of the cross-section in respect of which the diameters are measured is perpendicular to the axis (i.e the main axis) of the sock. The main axis of the sock is defined as the line that is drawn between two points on the inside wall of the casing of the sock, than which no other two such points are further apart. Insofar as the sock has some flexibility, the distance apart of the two points is measured when the sock is arranged in such manner that the said distance has been maximised.

Cross-sections of the sock may be taken at any point along the length of the main axis of the sock, and diameters may be taken between any two points on opposite sides of the cross-sectional shape at which the above parallel-tangent provision obtains. Each cross-sectional shape has one maximum diameter and one minimum diameter (which happen to coincide when the cross-sectional shape is a circle).

A cross-section is said, herein, to be approximately circular, when the following conditions apply. The main axis of the sock has an overall length OL, and respective cross-sections can be taken at all locations along the length OL of the main axis. In respect of a cross-section taken at location x along the axial length:— diameters can be measured between every pair of points that are in the said parallel-tangent relationship;

in respect of the cross-section taken at location x, the largest one of the diameters of the casing at that location x is Dx-max, and the smallest one of the diameters of the casing at that location x is Dx-min;

the sock is said to be at least approximately circular, at the location x, when Dx-max is no more than about double Dx-min.

Often, the sock will be of a more or less uniform shape and size along its axial length. In that case, if the sock is circular at one cross-section, it will likewise be circular at all the other cross-sections. In the case of a sock whose shape and diameters vary considerably, from cross-section x to cross-section y, the sock is said to be approximately circular, as a whole sock, if Dx-max is no more than about double Dy-min, in respect of at least eighty percent of all the cross-sections x and y along the axial length of the sock.

Also preferably, the sock, in addition to being approximately circular as to its cross-sectional shape, should be, as to its overall three-dimensional configuration, at least approximately cylindrical. Cylindricity is defined, in this context, as follows.

The casing of the sock has a working length WL, WL being eighty percent of the overall axial length OL of the casing;

over the working length WL, the largest of the Dx-max diameters of the casing is termed D-MAX;

over the working length WL, the smallest of the Dx-min diameters of the casing is termed D-MIN;

a cross-section of the casing of the sock is to be regarded as being at least approximately cylindrical, when D-MAX is no more than about double D-MIN. (It is not ruled out that, in some applications, it might be preferred for the sock to be more nearly spherical than is indicated by this definition.)

The above indications of circularity and cylindricity apply when the sock is wet; that is to say, when the sock is in position, in the apparatus, and water is undergoing treatment in the apparatus.

Also preferably, the cylindrical sock should have the form of a long, thin cylinder. Whether a sock is, or is not, a long thin cylinder is defined in terms of the working length WL of the sock, and its largest diameter D-MAX. The sock is a long thin cylinder when WL is about three times D-MAX or longer.

When the casing of the sock is (as preferred) flexible, preferably the stuffed sock should not be so soft that it sags significantly under its own weight. This non-sag condition may be defined as follows, by relating the dry and wet conditions of the sock.

The DRY condition of the sock is the condition of the sock when there is no perceptible wetness or moisture present in the sock, the sock being indoors in a habitable room. The WET condition of the sock is the condition of the sock during usage of the sock in the system for treatment of contaminated water.

For assessing the degree of flexibility/rigidity of the sock, it is assumed that the stuffed sock is supported, as a whole structure, from below. When the sock, so supported, is changed from its DRY condition to its WET condition (which can happen, for example, when the sock receives its first dose of contaminated water, during initial operation of the system), the sock will sag perceptibly, as a result of that change. Generally, vertical dimensions of the sock will be perceptibly reduced and horizontal dimensions of the sock will be perceptibly increased. Preferably, the stuffed sock should be so rigid that, upon the sock being changed from its DRY condition to its WET condition, none of the horizontal dimensions of the sock increases by more than about ten percent.

When the stuffed sock, as a unit, is this rigid, the gaps and passageways between the socks can be maintained in a wide-open condition, whereby air can circulate freely over most of the outer surfaces of the socks. By contrast, if the socks were to sag as much as, say, sandbags, for example, the likelihood then would be for the sagging socks to restrict the air passages, or even to prevent any flow of air at all.

Preferably, the filter material, in addition to being water absorbent, is also water-retaining, in that, when the filter material is dosed with water, and such dosing is then discontinued, and the material is left to drain freely, the filter material retains a substantial quantity of the dosed water within itself for at least several hours.

Thus sand, for example, would not qualify as a water-retaining material. A body of sand might have some degree of capillary action, and thus be water-absorbent, but, upon the dosing being discontinued, the nature of sand is that the water quickly drains out from the body of sand, more or less completely. Sandbags arranged in a vertical stack substantially do not have the ability to retain water over a period of several hours.

The piece or pieces of filter material in the sock preferably are stuffed into the sock so tightly that the pieces are under compression. That is to say, the pieces are stuffed in so tightly that they press against the casing, and so cause the casing to be in a condition of tension. Preferably, the pieces should be stuffed into the casings so tightly that portions of the pieces bulge out through the apertures of the net or mesh.

The piece or pieces preferably should be stuffed into the casing so tightly, preferably over the whole extent of the sock, that basically the piece or pieces cannot move, i.e cannot move with respect to the casing of the sock.

The socks should not just be filled to capacity with the filter material; rather the socks should be over-filled, whereby the (elastically resilient) pieces of filter material are under compression, and the material of the casing is under tension.

The casing of the sock preferably is made of net or mesh, in which cords or threads (collectively termed "cords") of material define apertures. Each aperture of the net or mesh is surrounded by, and is defined by, cords of the casing. The cords meet and touch each other at meet-points of the casing. (It may be noted that, when the casing is flexible, each cord is incapable of supporting any form or stress other than tensile stress. When the casing is rigid, each cord may be capable of also supporting e.g compressive or bending stress.)

Where the casing of the sock is arranged as a square mesh, each aperture is defined by, and enclosed by, four cords. Equally, in a square mesh, each meet-point assists in defining four of the apertures. The sock should be stuffed so tightly that substantially every one of the cords that make up the casing is under tension.

The cords of the net or mesh may be fixed together at the said meet-points (as when the material of the casing is moulded plastic, for example), or the cords may simply overlie each other at the meet-points (as when the material of the casing is a (loosely) woven fabric, for example).

Thus, conventional geotextile fabric material, being structured to enable water to pass freely through the material, can be regarded as a net or mesh, for the purposes of this specification.

It should be noted that the all-cords-in-tension condition, as described herein, applies when the sock is in its operational disposition, and has been fully wetted, but is not distorted by the presence of other socks. When the sock becomes wet, and is residing in a stack of wet socks, the weight of the absorbed water can distort the sock, which might result in some of the cords of the casing of the sock being no longer under tension. The casing of the sock cannot be said to be under the all-cords-in-tension condition if, for example, the casing is crumpled or folded.

The desirability of the socks being stuffed so tightly that substantially all the cords of the casing of the sock are stressed in tension may be explained as follows. It is advantageous that the socks should have some degree of rigidity. Especially when the socks are stacked upon each other, in layers, the socks should remain rigid enough, as individual physical structures, that the air spaces between the socks are maintained. When the socks are thoroughly wetted with absorbed water, they will tend to sag. It is recognised that, if all the cords of the casings of the socks are in tension when the sock is undistorted, then the voids and air spaces between the casings will still remain open, even when the socks are in full operation.

Indeed, one of the ways in which the socks may be regarded as being stuffed tightly enough is that the stuffed socks are so rigid that the voids and spaces between the socks remain open to the throughflow of air, when the socks are stacked and are thoroughly wetted with the water undergoing treatment.

If the socks were to be only loosely filled, the socks might not be rigid enough to maintain the air spaces between the socks. It may be noted, illustratively, that one of the reasons sandbags can be used to construct watertight floodwater barriers is that the sandbags are not over-filled; thus, the sandbags can sag (distort) sufficiently to close off the air gaps between the bags. It may be noted that, if the sandbags were to be overfilled, i.e packed tightly with sand, they might then become too rigid to be used as watertight barriers, i.e they might then not sag sufficiently to block off the voids and spaces. It is emphasised that, in the present system, the intent is for the voids and spaces between the adjacent socks to be maintained.

It has been mentioned that the sock should be stuffed so tightly that substantially all the cords of the net or mesh material of the casing of the sock should be stressed in tension. That is not to say that every single cord, without exception, must be under tension, but rather that enough of the cords should be in tension that the stuffed sock is characterizable, as a whole unit, as being a substantially rigid structure. One exception to the every-cord-in-tension condition might occur, for example, in the vicinity of a point of gathering, e.g where the casing of the sock is closed by being pinched or nipped, and clamped.

It has been assumed, in the above descriptions, that the preference has been followed in which the casing from which the socks are made, is flexible. That being so, the sock is termed a soft sock. When the casing is rigid, i.e when the sock is a hard sock, some considerations apply, which will now be described.

As shown in FIGS. 3,4, the soft socks (i.e socks with flexible casings) are arranged in the stack in the preferred criss-cross configuration. A soft sock, when stuffed tightly enough that the stuffed soft sock can be characterized as a rigid unit, will tend to be a roughly-round cylinder as to its cross-sectional shape. The criss-cross stacking arrangement is preferred, in the case of the soft socks, because that is a configuration that helps to ensure clear air-spaces between the soft socks—as shown in FIG. 3.

By contrast, if soft socks (socks with flexible casings) were arranged in-parallel, layer-by-layer as well as side-by-side, the soft socks would or might settle against each other, i.e settle into the troughs between adjacent socks, thereby cutting off the air circulation between the socks. A stack of parallel soft socks can be likened to a stack of (soft) sandbags, from this standpoint, and can be likened to a sack of sandbags also as to the resistance of the stack to the through-passage of water and air.

However, when the material from which the casing of the sock is made is rigid, the argument against stacking the socks in-parallel is not so clear. If the hard socks (i.e socks with rigid casings) were circular-cylindrical, and if the socks are stacked in-parallel layer-by-layer as well as side-by-side, the air-spaces between the hard socks would remain open, and air could still circulate freely between the hard socks.

Of course, hard socks need not be of the roughly-round cross-section that (almost) inevitably obtains when the socks are soft. If the rigid casings were to be of e.g a square cross-sectional shape, and if such hard square socks are stuffed tightly, it would or might be possible for the tightly-stuffed square hard socks, if arranged in an in-parallel configuration, to impede air circulation so much as to inhibit the desired aerobic remediation reactions.

Thus, if the hard socks are of such a cross-sectional shape that, when stacked in-parallel layer-by-layer as well as side-by-side, the shapes themselves do not automatically create air-spaces between the socks, the hard socks preferably should be stacked in a cris-cross configuration.

Preferably, the hard socks should be stuffed, like the soft socks, to such tightness that the foam or other stuffing material bulges (slightly) out of the apertures of the open mesh of the (hard) casing. That being so, it is the bulging foam pieces that make at least some of the direct contact, sock to sock, thereby creating drainage-bridges, and thereby aiding in the desired bucket-brigade or champagne-fountain type of water transfer down the whole height of the water-conducting and water-retaining stack of hard socks.

On the other hand, the desired bucket-brigade or champagne-fountain type of water transfer can be procured, with hard socks, even if the foam (or other absorbent material) does not bulge out from the apertures in the mesh. In the case of a hard sock, even if the foam does not bulge out, still the (wet) absorbent material presses against the material of the mesh of the rigid casing, and that contact creates a narrow throat, i.e a drainage bridge, through which water can escape from the foam. Thus, after the socks have received, and have been soaked by, a dose of wastewater from above, some of the water drains out of the piece of foam through the contact between the piece of foam and the mesh upon which that piece of foam is resting, acting as a drainage-bridge, and drips down onto the sock below, until the remnant volume left in the piece of foam is the volume that can be supported by the capillary capacity of that piece of foam with that drainage-bridge. Thus, the water held up inside the piece of foam is replaced, each dosing, whereby the water inside the pieces of foam does not become stagnant.

Where the casing of the sock is rigid, and where the socks are stacked in-parallel, layer-by-layer as well as side-by-side, the cross-sectional shape of the hard sock should not be a shape that stacks without gaps, such as square, hexagonal, etc. Hard socks with casings of those shapes should be stacked criss-cross, in order to ensure good exposure to air.

Some of the optional features of the present technology will now be expressed, as follows.

Optionally, the casing is tubular, the tube of the casing being of substantially constant diameter along its axial length.

Optionally, the casing of the sock is configured, at least approximately, as a long thin cylinder, and optionally the overall diametral dimension of the sock, measured at right angles to the axis of the cylinder, is eight cm or less.

Optionally, the casing of the sock is configured, at least approximately, as a long thin cylinder, in that WL is three times D-MAX or longer, and the overall length OL of the sock is measured with the sock so arranged that the axis of the cylinder is a straight line, from end to end of the sock, OL being the length of that straight line.

Optionally, the material of the casing is flexible, and the piece or pieces of filter material are stuffed into the casing of the sock in such manner that the stuffed sock, as a unit, has enough structural stiffness that, during operation of the apparatus to treat water passing through the filter material, the stuffed sock retains its approximate circularity, as defined.

Optionally, the piece or pieces of filter material are stuffed into the casing with such a degree of tightness as to lie squashed together, and lie in contact, at many contact-patches, with each other and with the casing.

Optionally, the absorbent filter material has an outer-surface, which, upon the absorbent material being stuffed into the sock, lies folded or crumpled in such manner that at least upwards-facing portions of the outer-surface, being portions that are open to the air surrounding the sock, include many indentations; and preferably the indentations are so configured that water presented to the upwards facing portions collects in the indentations before soaking down into the absorbent material.

Optionally, the sock is closed-ended, in that both ends of the casing are closed, to the extent that the closed ends physically retain the filter materiel within the casing.

Optionally, the water being treated in the apparatus is effluent water from a septic tank.

Optionally, the diameter of the sock is more than ten cm and less than twenty cm, and the length of the sock is more than sixty cm and less than two meters.

Optionally, the sock contains many pieces of filter material, the pieces being physically detached or separate from each other prior to being stuffed into the sock.

Optionally, the filter material, and also the material of the casings, are substantially inert with respect to the contaminated water being treated.

Optionally, the apertures defined by the mesh are so large that, in respect of eighty percent or more of the apertures of the casing of the sock, a circle of at least five millimeters diameter can be inscribed within the aperture; and the pieces of water-absorbent material are large enough that they can be contained by mesh with such apertures.

Optionally, the casing of the sock is flexible, whereby the sock can be characterized as a soft sock; alternatively, the casing of the sock is rigid, whereby the sock can be characterized as a hard sock.

The numerals used in the drawings can be summarised as:—
20 tubular casing
23 apertures
25 stuffed socks
27 pieces of polyurethane foam
29 horizontal layers of socks
30 biological filtration apparatus
32 stack of layers of socks
34 rigid plastic retaining cage
36 water inlet port
38 nozzle or sprinkler
40 drip collector
43 drain port
50 water-containing tank
52 water inlet port
54 outlet port
56 level of water in tank
58 suspension point

The invention claimed is:

1. A biological treatment apparatus, for treating contaminated water, wherein:
the apparatus includes several stuffed socks, arranged as a stack of socks;
the apparatus includes an operable water-depositor, which, when operated, deposits water undergoing treatment on top of the stack of socks, and is so arranged that the deposited water trickles down through the stack of socks;
the stack is free-draining;
in respect of each sock:
(a) the sock includes plural pieces of biological treatment material;
(b) the treatment material is water absorbent, being capable of absorbing water by capillary action;
(c) the sock includes a casing, and the plural pieces of material are all stuffed inside the casing;
(d) the casing is of net or mesh, having open spaces or apertures;
(e) the apertures are so large that water can pass substantially freely through the casing;
(f) the apertures are so small, in relation to the size of the pieces, that the casing physically retains the pieces;
(g) the plural pieces of treatment material are stuffed so tightly in the casing that substantially all the pieces are:
(ga) compressed inside the casing;
(gb) constrained by the tightness against being free to float or move about within the casing; and
(gc) substantially unable to move relative to the casing;
the tightly-stuffed socks have respective outer-surfaces;
in respect of at least half the tightly-stuffed socks, at least half of the area of the outer surface of the sock is directly exposed to air around the sock; and
the apparatus is so arranged that air can circulate freely over the exposed areas.

2. As in claim 1, wherein:
the material of the casing is flexible;
the net or mesh comprises many cords of the material of the casing, which separate and define the apertures;
the sock is stuffed so tightly that the cords that make up the casing are stressed in tension;
insofar as not every single one of the cords of the casing is stressed in tension, still enough of the cords are stressed in tension, and the sock is stuffed so tightly, that the sock is characterizable, as a whole unit, as a substantially rigid structure.

3. As in claim 1, wherein the stuffed sock is at least approximately circular in that:
at a cross-section taken at a location x along the overall length OL of the casing, the maximum diameter of the casing at that location x is Dx-max, and the minimum overall diameter dimension of the casing at that location x is Dx-min;
the casing of the sock has a working length WL, WL being at least eighty percent of the overall length OL of the casing;
over the working length WL, the largest of the Dx-max dimensions of the casing is termed D-MAX;
over the working length WL, the smallest of the Dx-min dimensions of the casing is termed D-MIN;
a cross-section of the casing of the sock is at least approximately circular, in that:
D-MAX is no more than double D-MIN.

4. As in claim 1, wherein the stuffed sock is so structured that the location inside the sock that is furthest from the casing of the sock is no more than four centimeters from the casing.

5. As in claim 1 wherein:
the apparatus is so arranged that water can drain out from the bottom of the stack;
the apparatus includes a water-collector, which collects water draining out from the bottom of the stack;
the apparatus includes an outlet-conduit or drain, through which the collected treated water is conveyed away;
the water-depositor is operable periodically, to deposit the water undergoing treatment in discrete doses;
the apparatus is so arranged that doses are spaced apart over a period of time, the stack being not subjected to deposition of water between dosings.

6. As in claim 5, wherein:
the apparatus is so arranged that the stack of socks is free-draining, in that the socks are not submerged in water;
the absorbent treatment material is effective to absorb, by capillary action, water sprinkled or sprayed on top of the stack; and
the treatment material is effective to retain water, in that, when the material is dosed with water, and such dosing is then discontinued, the material retains a substantial quantity of the dosed water in the material for at least several hours.

7. As in claim 1, wherein:
the several socks are arranged in a stack of socks, in which the socks rest one upon another;
the apparatus is structured to deposit water to be treated by aeration on top of the stack of socks, and is so structured that the water trickles down, by gravity, through the stack of socks;
the apparatus is so structured that the aerated water drains out from the bottom of the stack of socks; and
the number of socks in the apparatus is such that substantially all the water deposited on top of the stack of socks trickles down through at least four socks, prior to draining out from the bottom of the stack of socks.

8. As in claim 1, wherein:
the stack is arranged in horizontal layers of socks, in which all the socks of one layer are aligned with their axes at least approximately parallel with each other; and
the socks in one layer are oriented at a substantial angle with respect to the socks in the layers above and below.

9. As in claim 1, wherein the stuffed socks are stuffed socks in respect of which, if and when the stuffed sock is subjected to following test, namely:

(a) the volume of the sock being Vsock liters, Vsock being the volume measured by encasing the stuffed sock in a bag of impermeable material and measuring the displacement of the bag;
(b) supporting the stuffed sock with its cylindrical axis horizontal;
(c) providing a volume of water equal to Vsock liters;
(d) trickling that volume of water on top of the horizontal sock, evenly over the length of the sock; and
(e) collecting and measuring the volume Vdrain that drains out from underneath the sock;
a result of the test is that the volume Vdrain is no more than half the volume Vsock.

10. As in claim 1, wherein:
the absorbent treatment material is plastic foam, the cells of which are open and interconnected; and
the foam is soft and pliable and is elastically resilient, to the extent that the foam, upon being squeezed by hand and released, regains its shape.

11. As in claim 1, wherein:
the treatment material stuffed into the sock is one of:
(a) plastic foam, including foam in the form of sheets, and including foam that has been shredded, or sliced into ribbons;
(b) coir fibres, derived from coconut husks;
(c) peat fibres;
(d) textile materials, including textile materials in the form of narrow strips; or
(e) a mixture of two or more of the above.

12. As in claim 1, wherein:
the material of the casing is flexible;
a DRY condition of the sock is the condition of the sock when there is no perceptible wetness or moisture present in the sock, the sock being indoors in a habitable room;
a WET condition of the sock is the condition of the sock during usage of the sock in the apparatus for treatment of contaminated water;
the degree of flexibility or rigidity of the stuffed sock, as a unit, is defined in that the stuffed sock, as a whole structure supported from below, is:
(a) so flexible as to sag perceptibly, in that vertical overall dimensions of the sock are perceptibly reduced and horizontal dimensions of the sock are perceptibly increased, upon the sock being changed from its DRY condition to its WET condition; and also
(b) so rigid that none of the horizontal dimensions of the sock changes, when the sock is changed from its DRY condition to its WET condition, by more than ten percent.

\* \* \* \* \*